(12) United States Patent
Gibbs (10) Patent No.: US 9,494,220 B2
(45) Date of Patent: Nov. 15, 2016

(54) APPARATUS FOR CONTROLLING OPERATION OF A TORQUE CONVERTER

(71) Applicant: Caterpillar Inc., Peoria, IL (US)

(72) Inventor: Jeremy Allen Gibbs, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 42 days.

(21) Appl. No.: 14/519,319

(22) Filed: Oct. 21, 2014

(65) Prior Publication Data

US 2016/0109011 A1    Apr. 21, 2016

(51) Int. Cl.
*F16H 45/02* (2006.01)
*F16H 45/00* (2006.01)

(52) U.S. Cl.
CPC ......... *F16H 45/02* (2013.01); *F16H 2045/002* (2013.01)

(58) Field of Classification Search
CPC .................. F16H 2045/002; F16H 45/02
USPC .............................. 192/3.27, 3.26
See application file for complete search history.

(56) References Cited

U.S. PATENT DOCUMENTS

| | | | | |
|---|---|---|---|---|
| 3,810,362 A | * | 5/1974 | Finke ..................... | F16H 61/58 60/362 |
| 3,820,417 A | | 6/1974 | Allen | |
| 4,153,147 A | * | 5/1979 | Chana ..................... | F16H 45/02 192/3.28 |
| 4,784,019 A | * | 11/1988 | Morscheck ............. | F16H 45/02 192/3.27 |
| 5,881,852 A | | 3/1999 | Fukushima | |
| 6,217,476 B1 | | 4/2001 | Muller et al. | |
| 2004/0188208 A1 | * | 9/2004 | Leber ...................... | F16H 45/02 192/3.25 |
| 2006/0016653 A1 | * | 1/2006 | Legner .................... | F16H 45/02 192/3.25 |
| 2011/0139562 A1 | * | 6/2011 | Nakamura .............. | F16H 41/30 192/3.29 |
| 2012/0210707 A1 | * | 8/2012 | Maienschein ........... | F16H 41/24 60/338 |

* cited by examiner

*Primary Examiner* — Ramya Burgess
*Assistant Examiner* — Lillian Nguyen
(74) *Attorney, Agent, or Firm* — Jeff A. Greene (57) ABSTRACT

An apparatus for controlling an operation of a torque converter having a turbine and an impeller includes a drive member, a first clutch member, and a second clutch member. The drive member is configured to rotate in unison with an output shaft of a prime mover. The first clutch member is associated with the impeller and disposed in selective engagement with the drive member. The first clutch member is configured to allow rotation of the impeller and cause torque multiplication to occur in the torque converter upon engagement with the drive member. The second clutch member is associated with the turbine and disposed in selective engagement with the drive member. The second clutch member is configured to allow rotation of the output shaft of the prime mover and the turbine in unison upon engagement with the drive member.

18 Claims, 7 Drawing Sheets

APPARATUS FOR CONTROLLING OPERATION OF A TORQUE CONVERTER

TECHNICAL FIELD

The present disclosure relates to an apparatus for controlling operation of a torque converter. More particularly, the present disclosure relates to an apparatus that has a reduced space claim and/or a lower component count while offering a simplified method of control in the operation of the torque converter.

BACKGROUND

Torque converters having a turbine and an impeller are typically known to employ a pair of clutches, namely—an impeller clutch that is associated with the impeller, and a lock-up clutch that is associated with the turbine. While these clutches are provided to help engage or disengage: a) the impeller from an output shaft of a prime mover, and b) the turbine from the output shaft of the prime mover, most designs of such torque converters require two distinctly located pistons to accomplish an individual and/or independent actuation of the impeller and lock-up clutches.

U.S. Pat. No. 6,217,476 (hereinafter referred to as the '476 patent) relates to a torque-transmitting device that is connected to a prime mover unit and a speed-changing transmission. The torque-transmitting device includes a hydrodynamic torque-converter with a pump wheel, a turbine wheel and a stator wheel. The torque-transmitting device has a disconnecting clutch to uncouple it from the prime mover unit.

The '476 patent also discloses that the torque-transmitting device may be provided with a lockup clutch of an essentially known design in order to bypass the torque converter when the rpm of the prime mover unit exceeds a set, pre-determined rpm value so that the torque flow is conducted directly from the housing to the transmission input shaft. Further, the '476 patent also discloses that in an advantageous configuration, the lockup clutch is shaped, likewise, as a piston that may be of a design corresponding to that of the piston associated with the disconnecting clutch.

However, previously known systems may entail a larger space requirement as they include a dual piston arrangement and such arrangements are typically accommodated within housings of the transmission and/or torque converter systems.

Hence, there is a need for an apparatus that operates on a simplified method for controlling a torque converter while also occupying lesser space to accommodate the clutches and associated pistons.

SUMMARY OF THE DISCLOSURE

In one aspect of the present disclosure, an apparatus for controlling an operation of a torque converter having a turbine and an impeller includes a drive member, a first clutch member, and a second clutch member. The drive member is configured to rotate in unison with an output shaft of a prime mover. The first clutch member is associated with the impeller and disposed in selective engagement with the drive member. The first clutch member is configured to allow rotation of the impeller and cause torque multiplication to occur in the torque converter upon engagement of the drive member with the first clutch member. The second clutch member is associated with the turbine and disposed in selective engagement with the drive member. The second clutch member is configured to allow rotation of the output shaft of the prime mover and the turbine in unison upon engagement of the drive member with the second clutch member.

In another aspect of the present disclosure, a method for controlling an operation of a torque converter having a turbine and an impeller disposed in selective engagement with each other is disclosed. The method includes coupling a drive member to an output shaft of the prime mover so as to rotate in unison. In one mode of operation, the method includes selectively engaging the drive member with a first clutch member to allow rotation of the impeller and cause torque multiplication to occur in the torque converter. In another mode of operation, the method includes selectively engaging the drive member with a second clutch member to allow rotation of the output shaft of the prime mover and the turbine in unison. In yet another mode of operation, the method further includes selectively disengaging the drive member from each of the first and second clutch members to disconnect the torque converter from a prime mover.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

Figure 1:
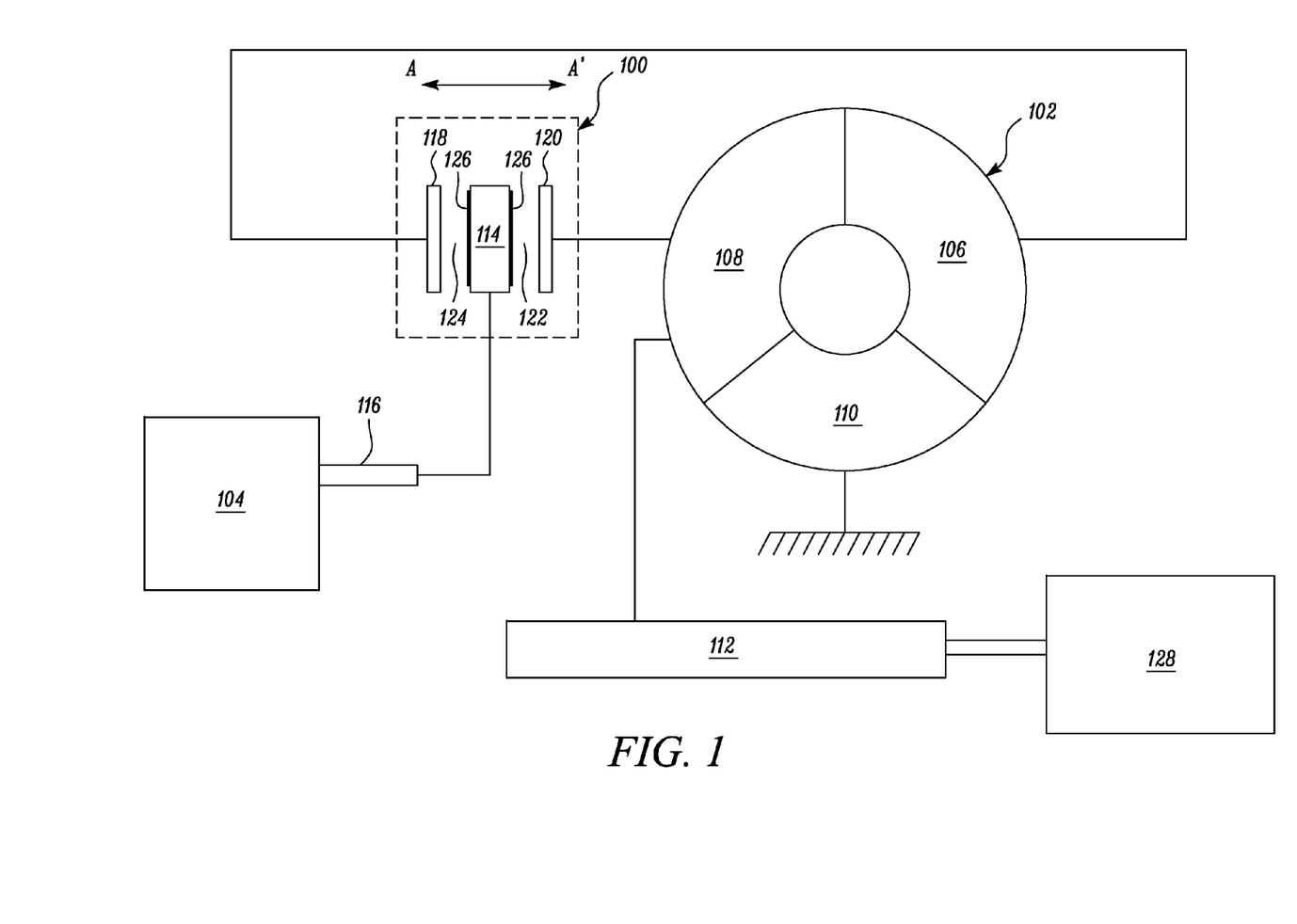
FIG. 1 is a diagrammatic illustration of an apparatus, in accordance with an embodiment of the present disclosure, for controlling operation of a torque converter rotatably driven by a prime mover.

FIG. 1 shows a diagrammatic illustration of an apparatus 100 in accordance with an embodiment of the present disclosure. The apparatus 100 of the present disclosure is configured to allow control in an operation of a torque converter 102 that is rotatably driven by a prime mover 104. In an embodiment as shown in FIG. 1, the prime mover 104 disclosed herein is embodied as an engine. The engine may be, for e.g., a single cylinder engine, a multi-cylinder engine, a gasoline engine, a diesel engine, an engine having inline configuration, an engine having V-type configuration and the like.

Although the present disclosure is explained in conjunction with an engine, other types of prime movers commonly known to one skilled in the art such as, but not limited to, electric motors, turbines and the like may be used to represent the prime mover 104 in lieu of the engine disclosed herein. Therefore, a type of prime mover is merely exemplary in nature and hence, non-limiting of this disclosure. The apparatus 100 may be used with any type of prime mover without deviating from the spirit of the present disclosure.

Furthermore, although in the present disclosure and the accompanying drawings i.e., FIGS. 1 through 6, the apparatus 100 and the torque converter 102 are represented distinctly i.e., the apparatus 100 is shown located outside of the torque converter 102 and as a separate unit from the torque converter 102. However, it should be noted that such representations are merely exemplary in nature, and hence, non-limiting of this disclosure. It will be appreciated by one of ordinary skill in the art that the apparatus 100 and the torque converter 102 of the present disclosure may be structurally integrated and implemented as a unitary component. Therefore, it should be noted that in various embodiments of the present disclosure, components disclosed as being part of the apparatus 100 alone may also form a part of the torque converter 102, and the vice-versa may also be similarly accomplished without deviating from the spirit of the present disclosure.

As shown in the diagrammatic illustration of FIG. 1, the torque converter 102 includes an impeller 106 and a turbine 108, each of which may be selectively engaged with the prime mover 104 during an operation of the torque converter 102, explanation to which will be made later herein. Moreover, the torque converter 102 further includes a stator 110 which is interposed between the impeller 106 and turbine 108 to alter a flow of fluid (oil) that is returning from the turbine 108 to the impeller 106. The stator 110 is configured to therefore, alter the drive's characteristics during periods of high slippage, producing an increase in output torque from the torque converter 102. In addition, the turbine 108 is also provided with an output shaft 112 that is rigidly coupled to the turbine 108.

With continued reference to FIG. 1, the apparatus 100 is disposed between the prime mover 104 and the torque converter 102. The apparatus 100 includes a drive member 114 that is coupled to an output shaft 116 of the prime mover 104 so as to rotate in unison with the prime mover 104. The drive member 114, in an embodiment as shown in FIG. 1, may be a piston. Further, the drive member 114 is configured to be axially movable along axis A-A'. The axial movement of the drive member 114 along direction A-A' may be accomplished by hydraulic, electrical, or mechanical means depending on specific requirements of an application, or as commonly known to one skilled in the art.

The apparatus 100 further includes a first clutch member 118 that is associated with the impeller 106 and a second clutch member 120 that is associated with the turbine 108. As shown in FIG. 1, the first clutch member 118 is disposed at a first side 122 of the drive member 114 while the second clutch member 120 is disposed at a second side 124 of the drive member 114. Therefore, the drive member 114 is disposed in a side-by-side relationship with the first and second clutch members 118, 120 so as to be interposed between the first clutch member 118 and the second clutch member 120.

The first and second clutch members 118, 120 are disposed in selective engagement with the drive member 114, explanation to which will be made in conjunction with FIGS. 2-3. Moreover, with reference to embodiments of the present disclosure, the drive member 114 may be provided with a frictional material 126 so as to engage with the first or the second clutch members 118, 120. The frictional material 126 may be attached to the drive member 114 by being sintered thereon, riveted thereto, bonded by adhesion thereon, or by other means commonly known to one skilled in the art. Alternatively, clutch members 118 and 120 may consist of clutch packs including a plurality of clutch plates and separator plates packaged together in a known fashion.

Figure 2:
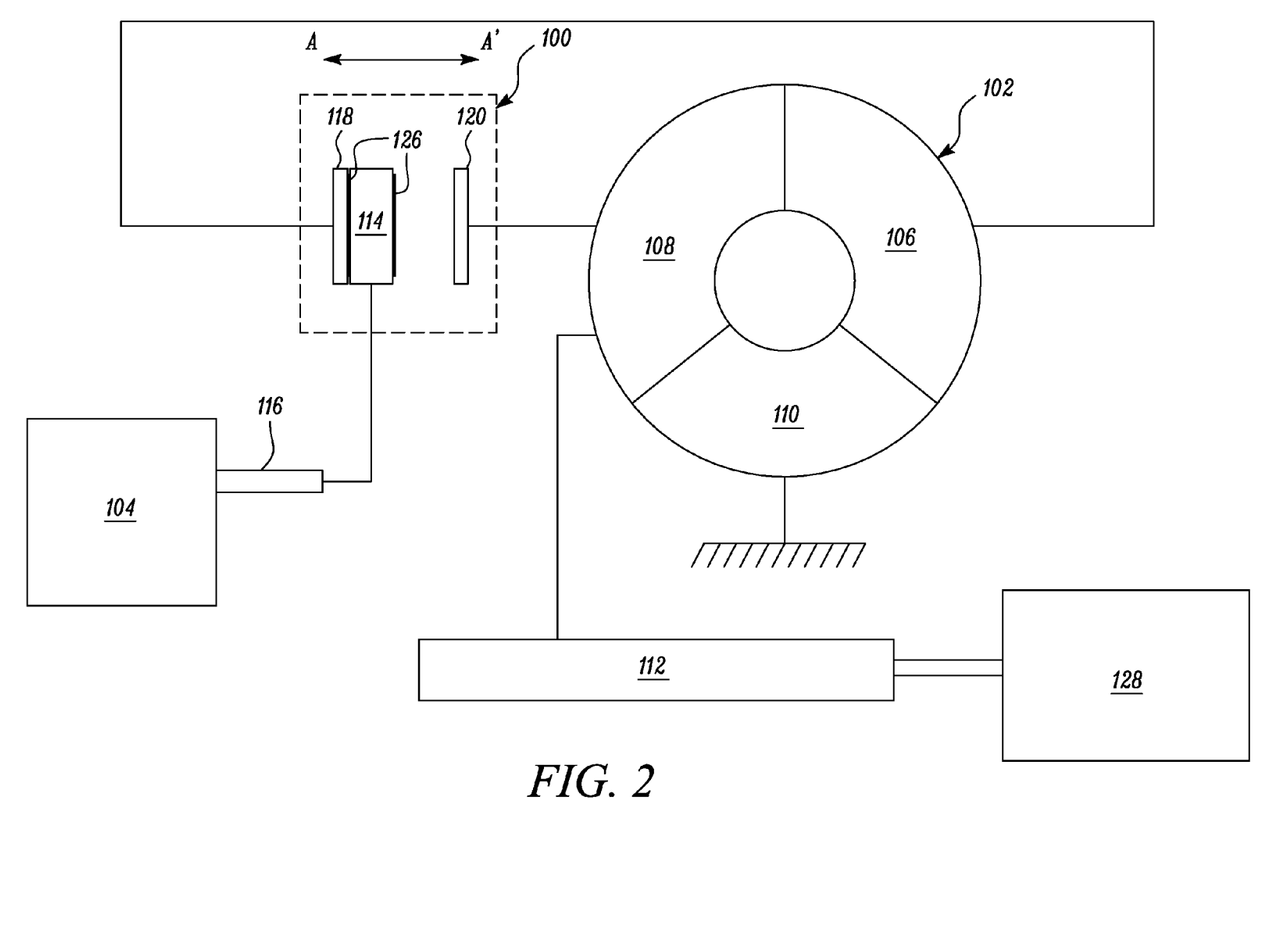
FIG. 2 is a diagrammatic illustration of the apparatus showing a drive member in selective engagement with a first clutch member.

Referring to FIG. 2, the apparatus 100 is shown in a first mode of operation where the drive member 114 is engaged with the first clutch member 118 associated with the impeller 106 of the torque converter 102. Engagement of the drive member 114 with the first clutch member 118 allows rotation of the impeller 106. As the drive member 114, driven by rotation of the output shaft 116 of the prime mover 104, rotates the impeller 106, the impeller 106 forces fluid (oil) to rotate within the torque converter 102 so that the movement of fluid (oil) may rotate the turbine 108 and the output shaft 112 of the torque converter 102.

Torque that is routed by way of the drive member 114 and the first clutch member 118 from the output shaft 116 of the prime mover 104 into the impeller 106 is multiplied by the movement of the fluid within the torque converter 102 before being delivered into the turbine 108 and the output shaft 112 of the torque converter 102. Therefore, rotation of the impeller 106 upon engagement of the drive member 114 with the first clutch member 118 causes torque multiplication to occur in the torque converter 102. Moreover, load borne by the output shaft 112 and the turbine 108 of the torque converter 102, for e.g., a transmission 128 coupled to the output shaft 112 of the torque converter 102, may be easily rotated from an initial start condition or a rest state.

Figure 3:
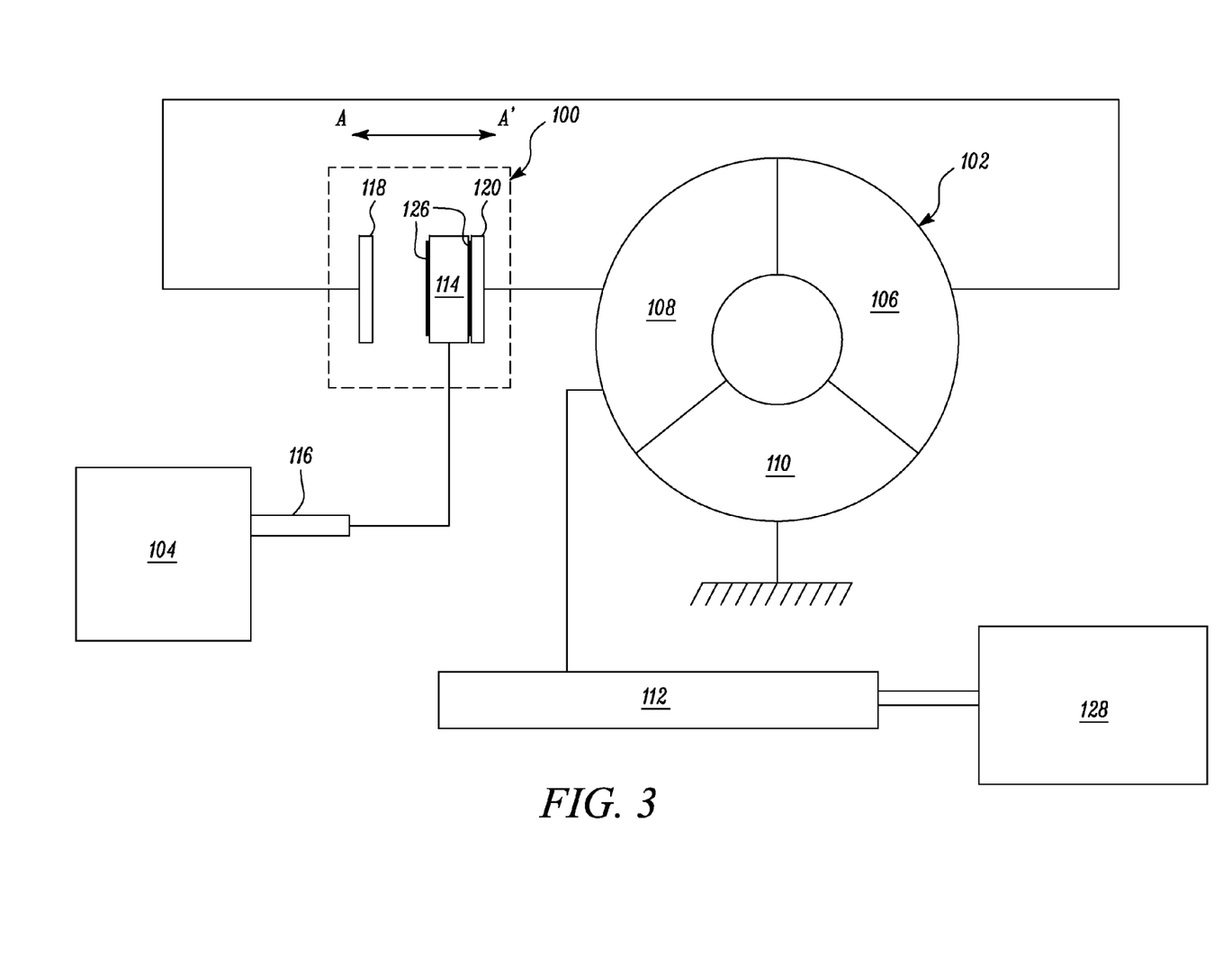
FIG. 3 is a diagrammatic illustration of the apparatus showing the drive member in selective engagement with a second clutch member.

Referring to FIG. 3, the apparatus 100 is shown in a second mode of operation where the drive member 114 is engaged with the second clutch member 120 associated with the turbine 108 of the torque converter 102. Engagement of the drive member 114 with the second clutch member 120 allows rotation of the output shaft 116 of the prime mover 104 and the turbine 108 in unison while the load, for e.g., by way of the transmission 128, continues to be borne on the output shaft 112 and the turbine 108 of the torque converter 102. This mode of operation may be implemented in the torque converter 102 when an overall efficiency in the transmission 128 of power from the prime mover 104 to the load, for e.g., the transmission 128, needs to be increased.

In this mode of operation, as the output shaft 116 of the prime mover 104 and the turbine 108 rotate at the same speed, the impeller 106 may follow a rotation of the turbine 108 i.e., the impeller 106 may rotate at substantially the same speed as that of the turbine 108 barring any speed losses resulting from drag or turbulence in the fluid (oil), or from the presence of the stator 110 in the torque converter 102. As such, the stator 110 may be beneficially mounted on a one-way clutch (not shown) as commonly known to one skilled in the art so that the one-way clutch allows the stator 110 to be able to rotate in the direction of rotation of the turbine 108 and the impeller 106, and at nearly the same speed as that of the impeller 106 and the turbine 108. Such a configuration may reduce the turbulence and drag in the fluid of the torque converter 102 when the second mode of operation is implemented.

With reference to FIGS. 2 and 3, it should be noted that an implementation of the first mode of operation and the second mode of operation at the torque converter 102 is mutually exclusive of one another i.e., when the drive member 114 is to be engaged with the first clutch member 118, the drive member 114 is disengaged from the second clutch member 120 and vice-versa. Therefore, at a given instant of time, the drive member 114 is configured to engage with the first clutch alone, or with the second clutch alone.

Referring again to FIG. 1, the apparatus 100 is shown in a third mode of operation in which the drive member 114 is disengaged from both, the first clutch member 118 and the second clutch member 120. Disengagement of the drive member 114 from both the clutch members, i.e., the first clutch member 118 and the second clutch member 120 may cause the torque converter 102 to be altogether disconnected from the prime mover 104. As a result, the load borne by the turbine 108 and the output shaft 112 of the torque converter 102 may no longer be driven by the prime mover 104. Moreover, during this mode of operation in the apparatus 100, power from the prime mover 104 may be beneficially used for driving other functions in a machine, for e.g., in driving various hydraulic components associated with the machine, for e.g., a pump for moving articulating arms or a bucket of an excavator, a dump truck and the like depending on the associated application of the apparatus 100.

Figure 4:
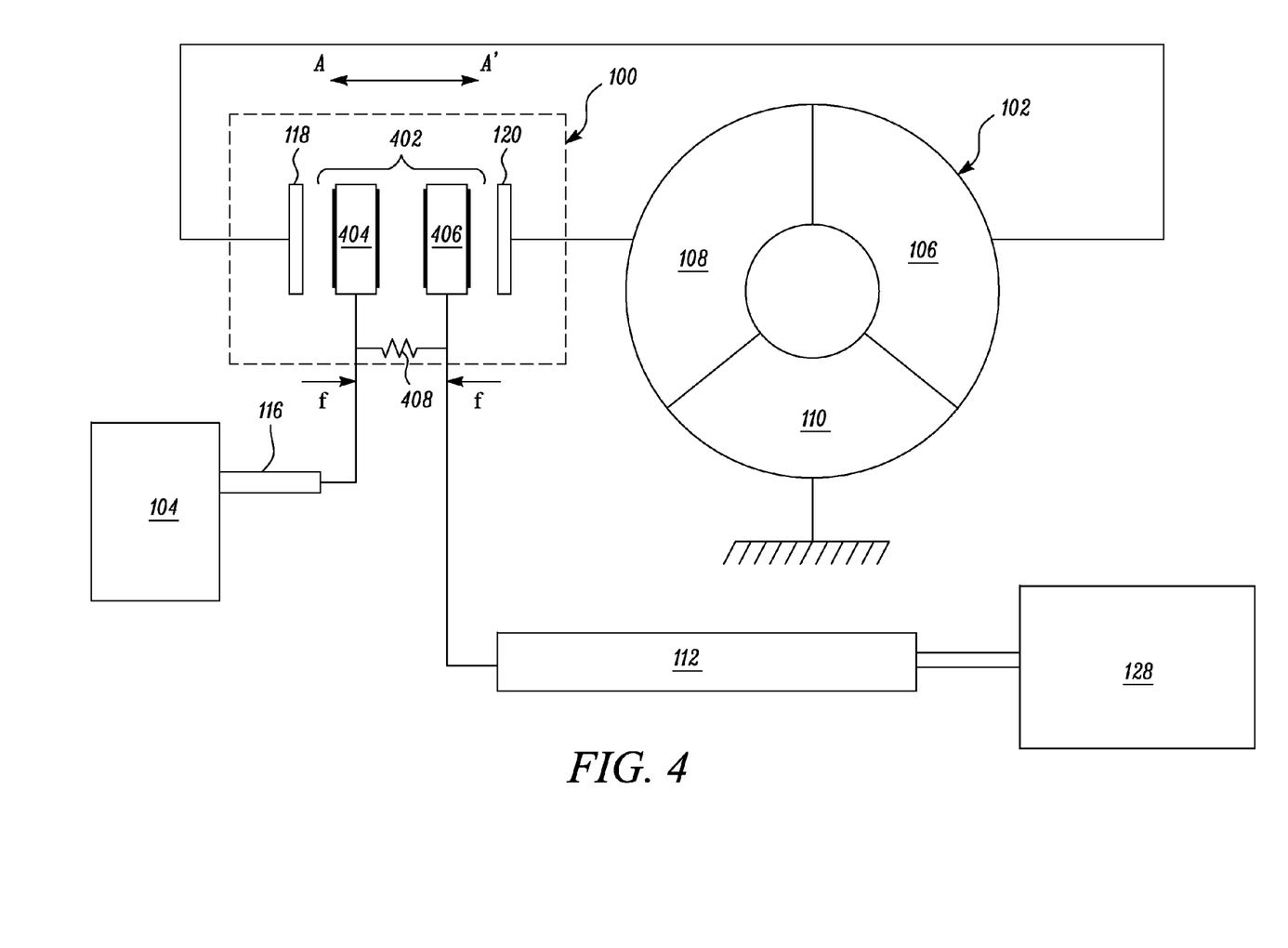
FIG. 4 is a diagrammatic illustration of the apparatus employing a first drive member and a second drive member in accordance with another embodiment of the present disclosure.

FIG. 4 shows a diagrammatic illustration of the apparatus 100 employing a drive member 402 in accordance with another embodiment of the present disclosure. In this embodiment, the drive member 402 includes a first drive member 404 and a second drive member 406. The first drive member 404 is coupled to the output shaft 116 of the prime mover 104 and hence, configured to rotate in unison with the output shaft 116 of the prime mover 104. Moreover, the first drive member 404 is disposed adjacent to the first clutch member 118. The first drive member 404 is configured to selectively engage with the first clutch member 118 or with the second drive member 406 as will be explained later herein.

The second drive member 406 is rigidly coupled to the output shaft 112 of the torque converter 102. Moreover, the second drive member 406 is disposed adjacent to the second clutch member 120. The second drive member 406 is configured to selectively engage with the second clutch member 120 or with the first drive member 404 as will be explained later herein.

As is the case with the drive member 114 from the embodiments of FIGS. 1-3, the first drive member 404 and the second drive member 406 disclosed herein may also be embodied in the form of pistons that are axially movable along axis A-A' (See FIG. 4). The axial movement of the first and second drive members 404, 406 along direction A-A' may be accomplished by hydraulic, electrical, or mechanical means depending on specific requirements of an application, or as commonly known to one skilled in the art.

Moreover, each of the first and second drive members 404, 406 may be provided with frictional material 126 so as to engage with the first clutch member 118 and the second clutch member 120 respectively. Further, the frictional material 126 may also allow a mutual engagement of the first and the second drive members 404, 406, explanation to which will be made later herein. The frictional material 126 may be attached to the first and second drive members 404, 406 by being sintered thereon, riveted thereto, bonded by adhesion thereon, or by other means commonly known to one skilled in the art.

With continued reference to FIG. 4, the apparatus 100 may further include a biasing member 408 that is coupled to the first and second drive members 404, 406. The biasing member 408 may be configured to perform and execute certain functions pursuant to various embodiments of the present disclosure, explanation to which will be made hereinafter. In the diagrammatic illustration of FIG. 4, the biasing member 408 is shown in the form of a compression spring. However, the compression spring is merely exemplary in nature and hence, non-limiting of this disclosure. Upon perusal of the present disclosure, one of ordinary skill in the art will acknowledge that numerous other types and configurations of biasing members such as, but not limited to, a tension spring can be optionally contemplated and used in lieu of the compression spring depicted in FIGS. 4-6.

Figure 5:
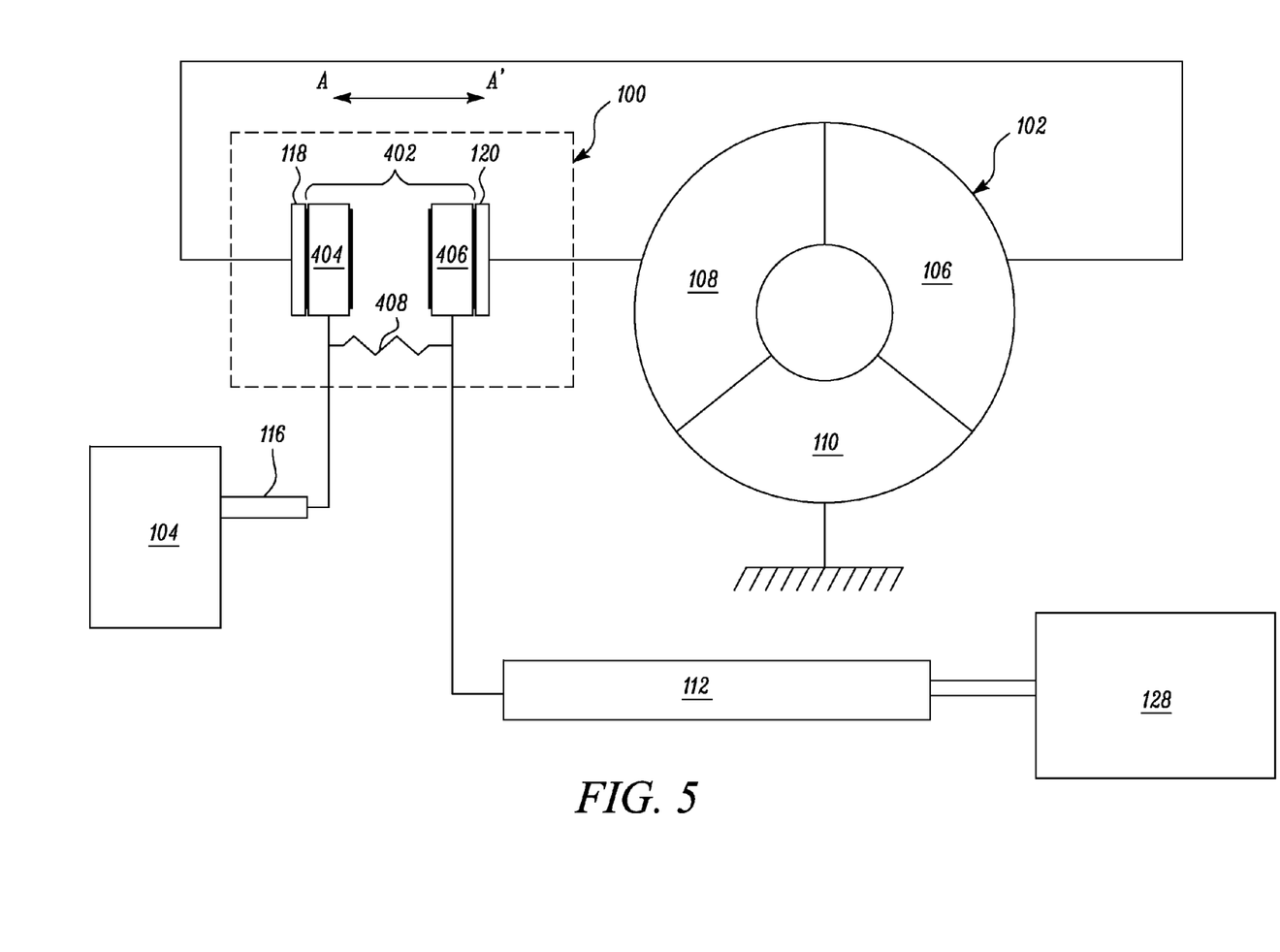
FIG. 5 is a diagrammatic illustration of the apparatus of FIG. 4 in which the first drive member is selectively engaged with the first clutch member and the second drive member is selectively engaged with the second clutch member.

Referring to FIG. 5, the apparatus 100 is shown with the first drive member 404 engaged to the first clutch member 118 and the second drive member 406 engaged to the second clutch member 120. Engagement of the first drive member 404 with the first clutch member 118 and engagement of the second drive member 406 with the second clutch member 120 allows rotation of the impeller 106 to cause a torque multiplication to occur within the torque converter 102. As the first drive member 404, driven from rotation of the output shaft 116 of the prime mover 104, rotates the impeller 106, the impeller 106 in turn forces fluid (oil) to rotate within the torque converter 102 so that the turbine 108 is rotated. As the second drive member 406 is also coupled to the turbine 108 by way of the second clutch member 120, the output shaft 112 of the torque converter 102 is rotated by rotation of the turbine 108.

Torque that is routed by way of the first drive member 404 and the first clutch member 118 from the output shaft 116 of the prime mover 104 into the impeller 106 is multiplied by the movement of the fluid within the torque converter 102 before being delivered into the turbine 108, the second clutch member 120, the second drive member 406, and the output shaft 112 of the torque converter 102. Therefore, rotation of the impeller 106 upon engagement of the first drive member 404 with the first clutch member 118 and second drive member 406 with the second clutch member 120 causes torque multiplication to occur in the torque converter 102. Moreover, load borne by the output shaft 112 and the turbine 108 of the torque converter 102, for e.g., the transmission 128 coupled to the output shaft 112 of the torque converter 102, may be easily rotated from an initial start condition or a rest state.

Referring back to FIG. 4, the apparatus 100 is shown with the first drive member 404 and the second drive member 406 disengaged from the first clutch member 118 and the second clutch member 120 respectively. In this mode of operation, the torque converter 102 is disconnected from the prime mover 104 and hence, any load for e.g., transmission 128, borne by the turbine 108 and the output shaft 112 of the torque converter 102 will not be rotated by the torque output from the prime mover 104. Moreover, during this mode of operation in the apparatus 100, power from the prime mover 104 may be beneficially used for driving other functions in a machine, for e.g., in driving various hydraulic components associated with the machine, for e.g., a pump for moving articulating aims or a bucket of an excavator, a dump truck and the like depending on a type of application with which the apparatus 100 is the associated.

Figure 6:
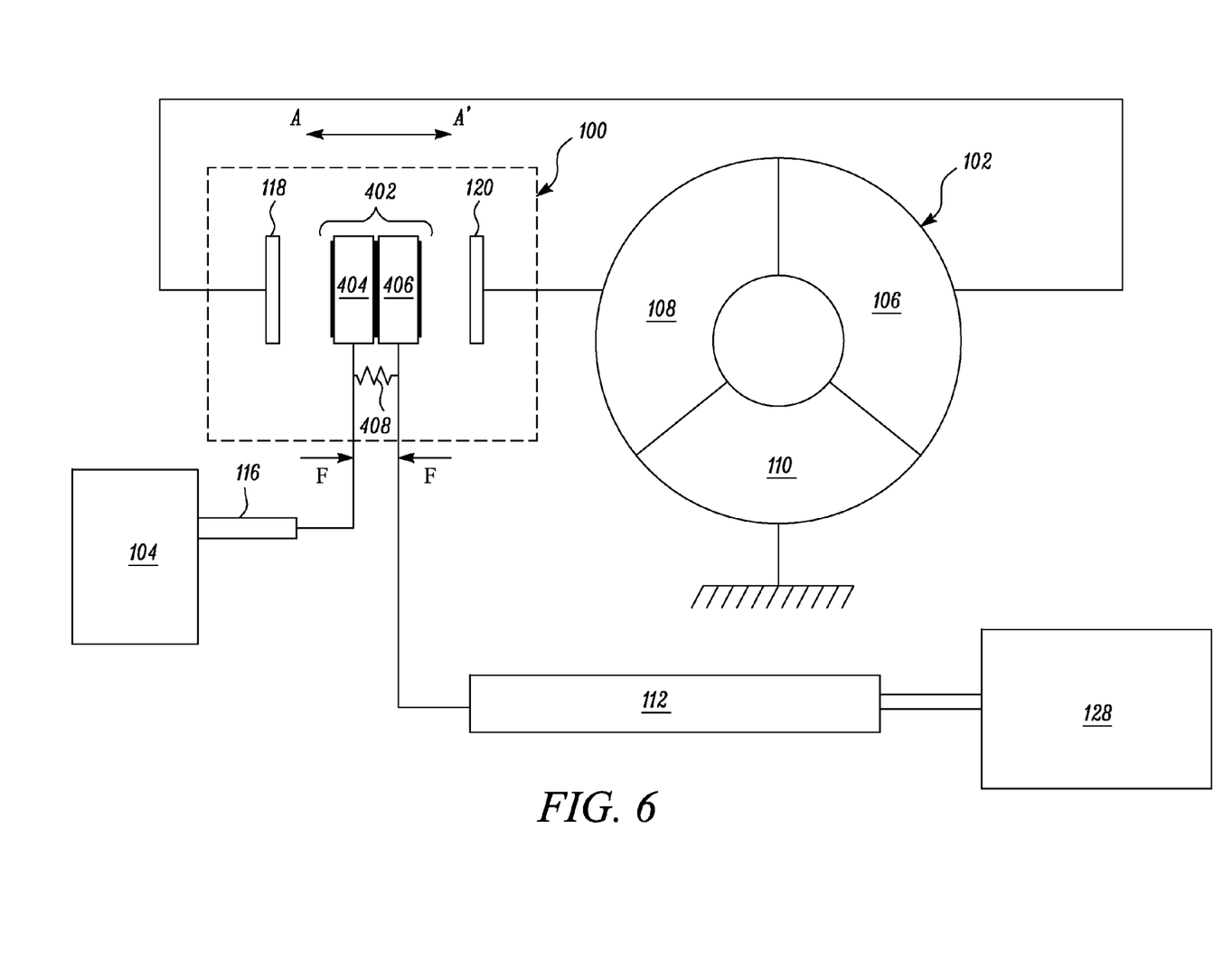
FIG. 6 is a diagrammatic illustration of the apparatus of FIG. 4 in which the first drive member and the second drive member are mutually engaged.

Referring to FIG. 6, the apparatus 100 is shown with the first drive member 404 and the second drive member 406 being mutually engaged to each other. In this mode of operation, torque input to the first drive member 404 from the output shaft 116 of the prime mover 104 is directly routed, by way of the second drive member 406, to the output shaft 112 of the torque converter 102. In this mode of operation, power losses resulting from fluid slippage in the torque converter 102 are not encountered as the turbine 108 and/or the impeller 106 are not rotated by the output shaft 116 of the prime mover 104. Therefore, in this mode of operation, the torque converter 102 may be considered as being entirely decoupled from the prime mover 104. As the prime mover 104 is configured to directly drive the output shaft 112 of the torque converter 102 by way of the engagement between the first and the second drive members 404, 406, this mode of operation may be conveniently regarded as a direct drive mode.

With reference to FIGS. 4 and 6, the first and second drive members 404, 406 are directly operable to accomplish: a) a disengagement of the first drive member 404 from the first clutch member 118 and disengagement of the second drive member 406 from the second clutch member 120 (See FIG. 4); and b) a mutual engagement between the first and second drive members 404, 406 (See FIG. 6). However, as shown in FIGS. 4-6, the biasing member 408 may be beneficially configured to execute functions such as, but not limited to, a) causing the disengagement of the first drive member 404 from the first clutch member 118 and the disengagement of the second drive member 406 from the second clutch member 120 (See FIG. 4); and b) biasing the first drive member 404 and the second drive member 406 towards the first clutch member 118 and the second clutch member 120 respectively.

In an embodiment, the biasing member 408 is beneficially configured to be applied with a small counter-actuation force 'f' in mutually opposing directions such that the force 'f' helps the first and the second drive member 404, 406 to be reset at their respective initial positions, i.e., positions at which the first and second drive members 404, 406 are disengaged from their respective adjacent clutch members 118, 120 without being mutually engaged to each other (See FIG. 4). In this embodiment, the biasing member 408 may be applied with the small force (as represented by 'f' in FIG. 4) to bring the first and second drive member 406 out of engagement with the first clutch member 118 and the second clutch member 120.

However, in order to accomplish a mutual engagement between the first and second drive members 404, 406 as shown in FIG. 6, the biasing member 408 may be applied with a large force (as represented by 'F' in FIG. 6) in mutually opposing directions so as to bring the first and second drive members 404, 406 together in engagement. In this manner, the first and second drive members 404, 406 may be biased out of their respective initial positions (See FIG. 4) and moved into a mutually engaged position with each other (See FIG. 6). Therefore, in various embodiments of the present disclosure, it should be noted that the biasing member 408 is further configured to be applied with the large force 'F' in mutually opposing directions so as to accomplish the mutual engagement between the first drive member 404 and the second drive member 406 (See FIG. 6).

It should be noted that the biasing member 408 is merely illustrative and explanatory in nature. Optionally, the axial movement of the first and second drive members 404, 406 along axis A-A' may be carried out by actuation forces alone, wherein such actuation forces alone are responsible for bringing about a movement of the biasing member 408. Also, one skilled in the art can optionally contemplate omitting the biasing member 408 and any of its forces from the apparatus 100 of the present disclosure. Therefore, it will be appreciated that numerous structures and/or methods can be contemplated for actuating the first and second drive members 404, 406 into and out of engagement with the respective clutch members and/or actuating the first and second drive members 404, 406 into mutual engagement with each other without deviating from the scope and spirit of the present disclosure.

Various embodiments disclosed herein are to be taken in the illustrative and explanatory sense, and should in no way be construed as limiting of the present disclosure. All directional references (e.g., axial, radial, above, below, upper, lower, top, bottom, vertical, horizontal, inward, outward, upward, downward, left, right, leftward, rightward, L.H.S, R.H.S, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 7:
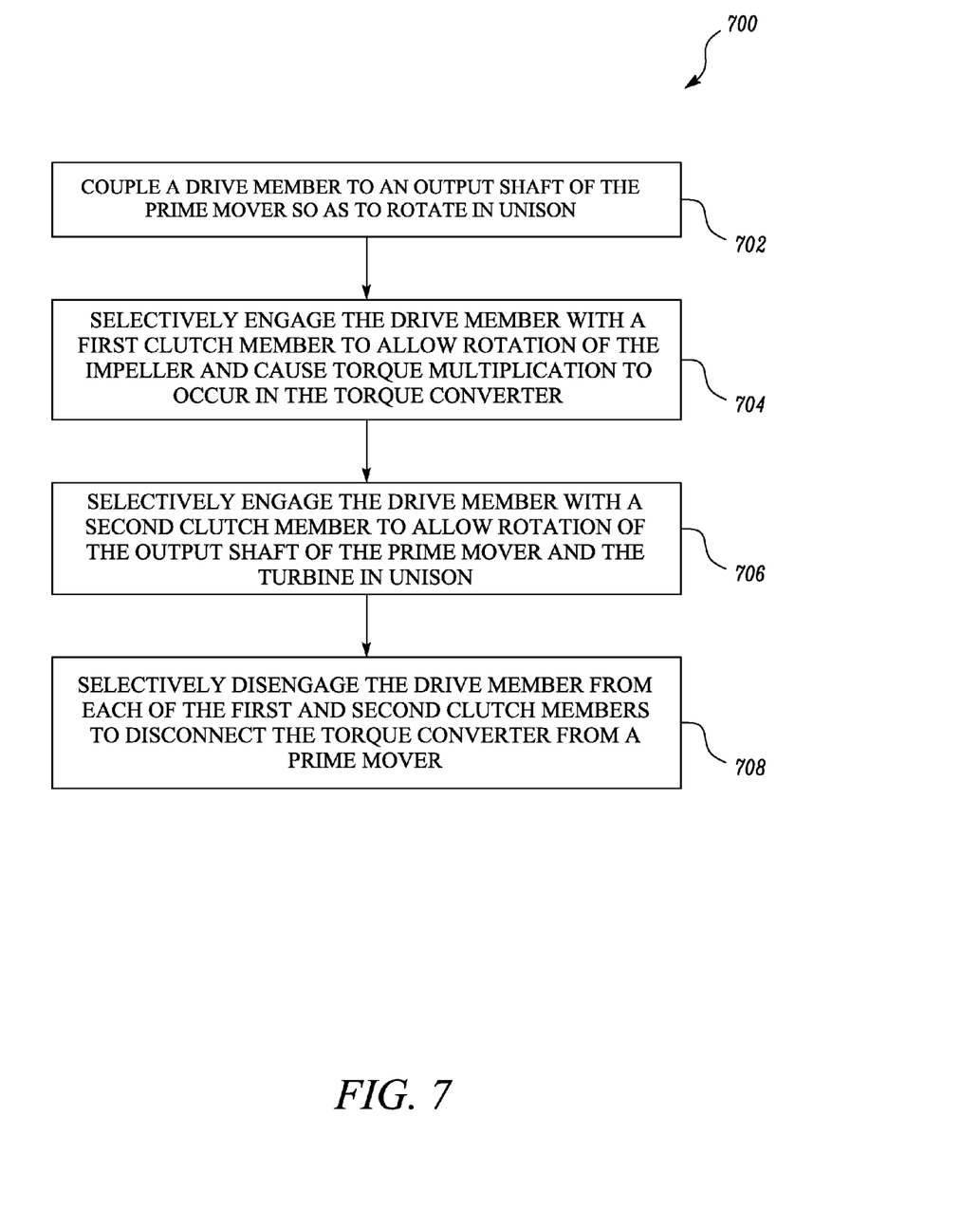
FIG. 7 is a flowchart illustrating a method for controlling an operation of the torque converter in accordance with an embodiment of the present disclosure.

FIG. 7 illustrates a method 700 for controlling an operation of the torque converter 102 in accordance with an embodiment of the present disclosure. At step 702, the method 700 includes coupling the drive member 114 to the output shaft 116 of the prime mover 104 so as to rotate in unison. The coupling of the drive member 114 to the output shaft 116 of the prime mover 104 may be beneficially accomplished by way of splining, bolting, keying, gearing, or other forms or means of connecting two components such that the output shaft 116 is capable of rotating the drive member 114.

At step 704, the method 700 includes selectively engaging the drive member 114 with the first clutch member 118 to allow rotation of the impeller 106 and cause torque multiplication to occur in the torque converter 102. At step 706, the method 700 includes selectively engaging the drive member 114 with the second clutch member 120 to allow rotation of the output shaft 116 of the prime mover 104 and the turbine 108 in unison.

As disclosed earlier herein, it should be noted that the steps 704 and 706 of the method 700 are mutually exclusive and independent of each other, i.e., if step 704 is to be carried out i.e., the drive member 114 is to be engaged with the first clutch member 118, then the drive member 114, if engaged, is disengaged from the second clutch member 120 before engaging the drive member 114 to the first clutch member 118. Similarly, if step 706 is to be carried out i.e., the drive member 114 is to be engaged with the second clutch member 120, then the drive member 114, if engaged, is disengaged from the first clutch member 118 before engaging the drive member 114 to the second clutch member 120.

At step 708, the method 700 further includes selectively disengaging the drive member 114 from each of the first and second clutch members 118, 120 (See FIG. 4) to disconnect the torque converter 102 from the prime mover 104.

Moreover, with regards to the embodiments of FIGS. 4-6 in which the first drive member 404 and the second drive member 406 are used, steps 702 through 708 can be suitably modified to suit the configuration of the apparatus 100 disclosed therein. For example, to implement the method 700 for the configuration illustrated in FIGS. 4-6, step 702 would include coupling the first drive member 404 to the output shaft 116 of the prime mover 104. Step 704 would include selectively engaging the first drive member 404 with the first clutch member 118 and the second drive member 406 with the second clutch member 120 such that the impeller 106 rotates to cause torque multiplication in the torque converter 102. However, in step 704 pertaining to the embodiment of FIGS. 4-6, the torque would be routed from the impeller 106 to the output shaft 112 of the torque converter 102 by way of the turbine 108, the second clutch member 120, and the second drive member 406.

Similarly, step 706 for the configurations illustrated in FIGS. 4-6 would include mutually engaging the first drive member 404 and the second drive member 406 such that the torque converter 102 is decoupled from the prime mover 104. As disclosed earlier herein, decoupling of the torque converter 102 from the prime mover 104 causes the power to be routed directly from the prime mover 104 to the output shaft 112 of the torque converter 102 by way of the first and second drive members 404, 406.

Similarly, the step 708 of method 700 can be suitably modified to adapt to the configuration of the apparatus 100 presented in FIGS. 4-6. In order to disconnect the torque converter 102 from the prime mover 104, the first drive member 404 and the second drive member 406 are disengaged from the first clutch member 118 and the second clutch member 120 respectively. Moreover, such disengagement from the first clutch member 118 and the second clutch member 120 is carried out without the first drive member 404 and the second drive member 406 becoming mutually engaged.

In methodologies directly or indirectly set forth herein, various steps and operations are described in one possible order of operation, but those skilled in the art will recognize that steps and operations may be rearranged, replaced, or eliminated without departing from the spirit and scope of the present disclosure as set forth in the claims.

Embodiments of the present disclosure have applicability for implementation and use in controlling the operation of a torque converter while also providing a simplified configuration that reduces space requirements to accommodate components of the torque converter.

Manufacturers of prime movers and torque converters often encounter tighter space constraints when designing components for the prime movers and/or the torque converters. Also, costs associated with components of the prime mover and/or the torque converter increase as the number of components used in the prime mover and/or the torque converter increase. Embodiments of the present disclosure are directed towards reducing the number of components used in controlling the operation of a torque converter while also offering simplified configurations of drive members and clutch members to help save space in a machine.

With use of the present disclosure, the drive member/s 114, 404, 406 and the clutch member/s 118, 120 are rendered into a compact configuration thereby allowing a manufacturer to utilize space in a machine more effectively. Moreover, implementation of the present disclosure allows various modes of operation to be effected in the torque converter 102 using the simplified apparatus 100 disclosed herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An apparatus for controlling an operation of a torque converter, the torque converter having a turbine and an impeller disposed in selective engagement with each other, the apparatus comprising:
   a drive member configured to rotate in unison with an output shaft of a prime mover;
   a first clutch member associated with the impeller and disposed in selective engagement with the drive member, wherein the first clutch member is configured to allow rotation of the impeller and cause torque multiplication to occur in the torque converter upon engagement of the drive member with the first clutch member;
   a second clutch member associated with the turbine and disposed in selective engagement with the drive member, wherein the second clutch member is configured to allow rotation of the output shaft of the prime mover and the turbine in unison upon engagement of the drive member with the second clutch member; and
   wherein the drive member is axially movable to selectively engage with the first clutch member and the second clutch member.

2. The apparatus of claim 1, wherein the drive member is operable to be disengaged from each of the first clutch member and the second clutch members so as to disconnect the torque converter from the prime mover.

3. The apparatus of claim 1, wherein the drive member is interposed between the first clutch member and the second clutch member such that the first clutch member is located at a first side of the drive member and the second clutch member is located at a second side of the drive member.

4. The apparatus of claim 1, wherein the drive member is provided with a frictional material configured to engage with one of the first clutch member and the second clutch member.

5. The apparatus of claim 1, wherein the drive member includes:

a first drive member disposed adjacent to and in selective engagement with the first clutch member, the first drive member configured to rotate in unison with the output shaft of the prime mover; and a second drive member disposed adjacent to and in selective engagement with the second clutch member, the second drive member rigidly coupled to an output shaft of the torque converter.

6. The apparatus of claim 5, wherein each of the first drive member and the second drive member is provided with frictional material thereon.

7. The apparatus of claim 5, wherein an engagement of the first drive member with the first clutch member and engagement of the second drive member with the second clutch member is configured to allow the impeller to rotate the turbine and cause torque multiplication to occur in the torque converter.

8. The apparatus of claim 5, wherein the first and second drive members are operable to accomplish a mutual engagement therebetween so that the first drive member and the second drive member rotate in unison to rotate the output shaft of the torque converter.

9. The apparatus of claim 5 further comprising a biasing member configured to bias the first and second drive members into engaging with the first clutch member and the second clutch member respectively.

10. The apparatus of claim 9, wherein the biasing member is configured to be applied with a force to mutually engage the first drive member and the second drive member so as to disconnect the torque converter from the prime mover.

11. A method for controlling an operation of a torque converter having a turbine and an impeller disposed in selective engagement with each other, the method comprising:
coupling a drive member to an output shaft of the prime mover so as to rotate in unison;
selectively engaging the drive member with a first clutch member to allow rotation of the impeller and cause torque multiplication to occur in the torque converter;
selectively engaging the drive member with a second clutch member to allow rotation of the output shaft of the prime mover and the turbine in unison;
selectively disengaging the drive member from each of the first and second clutch members to disconnect the torque converter from a prime mover; and wherein the drive member is axially movable to selectively engage with the first clutch member and the second clutch member.

12. The method of claim 11 further including:
disposing the first clutch member in association with the impeller and in selective engagement with the drive member;
disposing the second clutch member in association with the turbine and in selective engagement with the drive member.

13. The method of claim 12 further including locating the drive member between the first clutch member and the second clutch member such that the first clutch member is located at a first side of the drive member and the second clutch member is located at a second side of the drive member.

14. The method of claim 12 further including providing the drive member with a frictional material that is configured to engage with one of the first clutch member and the second clutch member.

15. The method of claim 12, wherein the drive member includes:
a first drive member disposed adjacent to and in selective engagement with the first clutch member, the first drive member configured to rotate in unison with the output shaft of the prime mover; and
a second drive member disposed adjacent to and in selective engagement with the second clutch member, the second drive member rigidly coupled to an output shaft of the torque converter.

16. The method of claim 15, further including engaging the first drive member with the first clutch member and engaging the second drive member with the second clutch member such that the impeller is configured to rotate the turbine and cause torque multiplication to occur in the torque converter.

17. The method of claim 16 further including disengaging the first and second drive members from the first and second clutch members respectively so as to disconnect the torque converter from the prime mover.

18. The method of claim 16 further including mutually engaging the first and second drive members to allow a rotation of the output shaft of the prime mover and the output shaft of the torque converter in unison.

* * * * *